US006203875B1

(12) United States Patent
Seidl et al.

(10) Patent No.: US 6,203,875 B1
(45) Date of Patent: Mar. 20, 2001

(54) SET WHICH CAN BE PRINTED ON

(75) Inventors: Joachim Seidl, Edling; Maximilian R. Seidl, München, both of (DE)

(73) Assignee: SLC Seidl-Lichthardt Consult & Marketing GmbH

( * ) Notice: Subject to any disclaimer, the term of this patent is extended or adjusted under 35 U.S.C. 154(b) by 0 days.

(21) Appl. No.: 09/354,621

(22) Filed: Jul. 15, 1999

(30) Foreign Application Priority Data

Jul. 22, 1998 (DE) ............................................. 198 33 038

(51) Int. Cl.$^{7}$ ........................................................ B32B 7/06

(52) U.S. Cl. ............................ 428/42.3; 428/189; 283/81

(58) Field of Search .................................. 428/42.3, 189; 283/81

(56) References Cited

U.S. PATENT DOCUMENTS 4,973,088 * 11/1990 Levy ..................................... 283/81

* cited by examiner

*Primary Examiner*—Alexander S. Thomas
(74) *Attorney, Agent, or Firm*—Muramatsu & Associates

(57) ABSTRACT

A set which can be printed on in a simple manner with reduced waste material. The set is formed of a flat supporting sheet and a plurality of flat repositionable adhesive information carriers each having a front and a back and are provided on their back with a layer of contact adhesive. All adhesive information carriers are disposed above one another and staggered with respect to one another on the supporting sheet in such a way that the first adhesive information carrier with its layer of contact adhesive is detachably disposed on the supporting sheet and the next adhesive information carrier in each case is disposed with its layer of contact adhesive detachably on the front of the adhesive information carrier lying below it, wherein in each case a region of the front of the underlying adhesive information carrier is not covered by the adhesive information carrier lying above it. All the adhesive information carriers have the same length.

12 Claims, 2 Drawing Sheets

SET WHICH CAN BE PRINTED ON

FIELD OF THE INVENTION

The invention relates to a set which can be printed on, consisting of a flat supporting sheet and a plurality of flat repositionable adhesive information carriers which each have a front and a back and which are provided on their back with a layer of contact adhesive.

BACKGROUND OF THE INVENTION

So-called "adhesive notes" have been known for some years in the art. These are small-format, usually yellow pieces of paper which are provided on the back at the top edge with a weak contact adhesive, so that such handwritten notes can be removed again, even from sheets of stationery and brochures, without leaving a residue.

Hitherto these notes have been written on by hand. However, there are numerous possible uses which make a computer-written small note appear desirable. In this way identical notes could be set up in a simple manner and would be easily legible.

Therefore it has already been proposed to dispose a plurality of adhesive notes beside and below one another on a A4 size supporting sheet in order that they can then be printed on with the aid of a computer and printer. However, if only one single note is to be provided with information, the use of this known supporting sheet is relatively awkward, since first of all the position of a note which has not yet been pulled off from the supporting sheet must be determined and correspondingly transferred to the computer program being used. Moreover, the supporting sheet remains as waste after all adhesive notes have been written on and detached.

SUMMARY OF THE INVENTION

The object of the invention, therefore, is to make further developments to the set which can be printed on in such a way that one single adhesive note can be printed on in a simple manner and in addition the waste material which accumulates is reduced.

This object is achieved according to the invention by the characterising features of. According to the invention all adhesive information carriers are disposed above one another and staggered with respect to one another on the supporting sheet in such a way that the first adhesive information carrier with its layer of contact adhesive is detachably disposed on the supporting sheet and the next adhesive information carrier in each case is disposed with its layer of contact adhesive detachably on the front of the adhesive information carrier lying below it, wherein in each case a region of the front of the underlying adhesive information carrier is not covered by the adhesive information carrier lying above it.

Due to the arrangement of the adhesive information carriers above one another the waste material can be reduced to a minimum. With the set according to the invention the uppermost adhesive information carrier in each case can be printed on. The adhesive information carrier which has been printed on can be detached from the set particularly easily because of the staggered arrangement of all adhesive information carriers. The next adhesive information carrier can then be printed on and pulled off in an analogous manner. Further embodiments of the invention are the subject matter of the pending claims as well and are explained in greater detail below with reference to the description of an embodiment and the drawings, in which:

DESCRIPTION OF THE DRAWINGS

FIG. 2 shows a plan view of the set which can be printed on,

FIG. 3 shows the back of such an adhesive information carrier 2, 3, 4 with a layer of contact adhesive 5 provided in a region of the back. This region extends in an edge region of the adhesive information carrier over the entire width thereof.

DESCRIPTION OF THE PREFERRED EMBODIMENTS

Within the scope of the invention, however, it is also conceivable for the backs of the adhesive information carriers to bc provided with a layer of contact adhesive over the entire surface.

Figure 6:
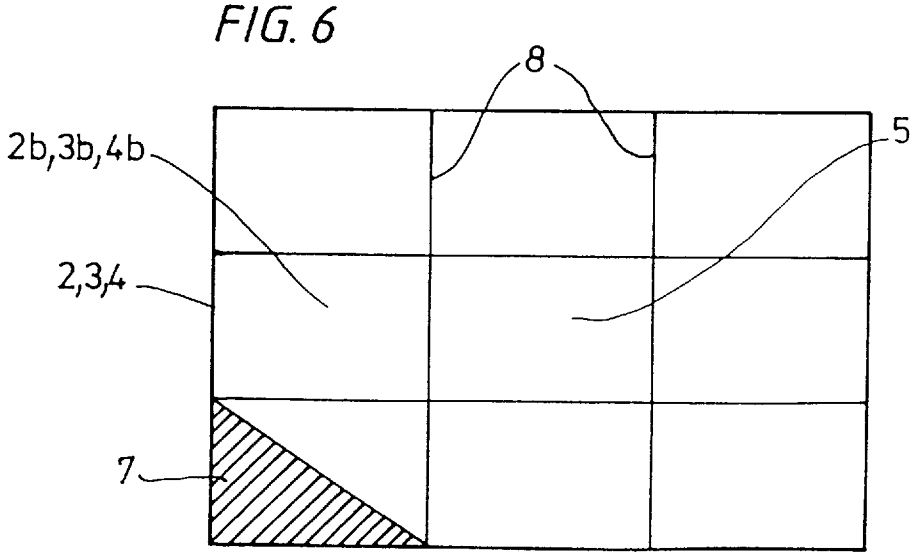
FIG. 6 shows a back of an adhesive information carrier according to a further embodiment. The set which can be printed on which is illustrated in the drawings consists of a flat supporting sheet I and a plurality of flat repositionable adhesive information carriers 2, 3, 4 which each have a front 2*a*, 3*a*, 4*a* and a back 2*b*, 3*b*, 4*b*.

A further embodiment of a back of an adhesive information carrier 2, 3, 4 is shown in FIG. 6. The back 2*b*, 3*b*, 4*b* of this adhesive information carrier has a layer of contact adhesive 5 over the entire surface up to a comer region 7 which is small in relation to the whole back. The corner region 7 which is not provided with a layer of contact adhesive enables the adhesive information carrier to be lifted and pulled off easily from the set.

In the production this comer region is either spared at the time of application of the entire layer of contact adhesive or is neutralised in a subsequent method step. The methods necessary for this are sufficiently known from the prior art.

The layer of contact adhesive must be so constructed that the adhesive information carrier can be detached without leaving a residue and can be stuck on again. Adhesives which are suitable for this are sufficiently known from the prior art.

Figure 1:
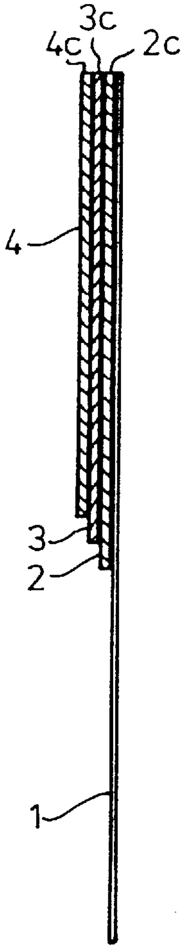
FIG. 1 shows a sectional representation along the line I—I in FIG. 2.
Figure 2:
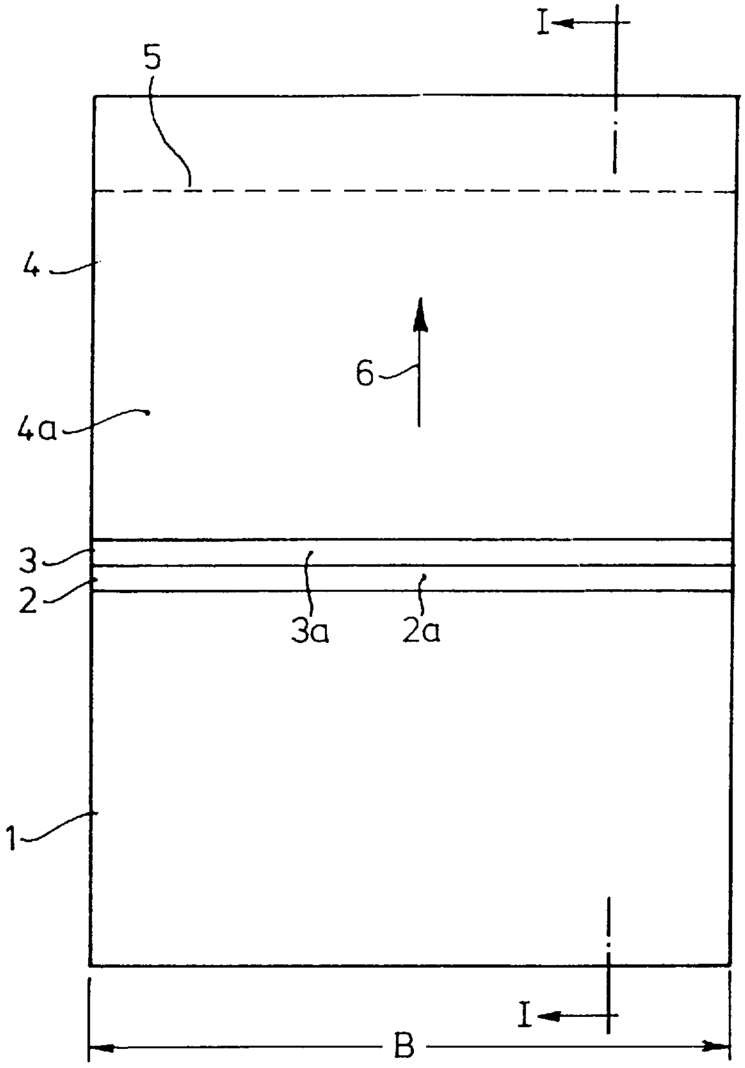
Figure 3:
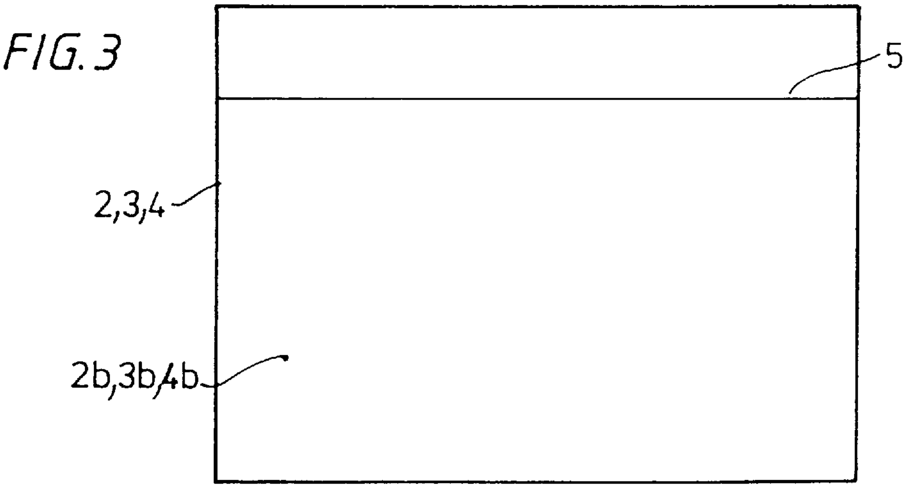
FIG. 3 shows the back of an adhesive information carrier.

The adhesive information carriers 2, 3, 4 of the set according to FIGS. 1 and 2 are disposed above one another and staggered with respect to one another on the supporting sheet 1 in such a way that the first adhesive information carrier 2 with its layer of contact adhesive 5 is detachably disposed on the supporting sheet 1 and the next adhesive information carrier 3, 4 in each case is disposed with its layer of contact adhesive 5 detachably on the front 2*a*, 3*a* of the adhesive information carrier 2, 3 lying below it. As is shown particularly by FIG. 2, in each case a region of the front of the underlying adhesive information carrier 2, 3 is not covered by the adhesive information carrier 3, 4 lying above it.

This staggered arrangement has the advantage on the one hand that the uppermost adhesive information carrier in each case can be detached particularly easily by slight bending of the set and on the other hand it is immediately visible how many adhesive information carriers are still available.

If, as indicated in FIG. 2, the layer of contact adhesive 5 is provided only in an edge region of the adhesive information carrier, then it is particularly advantageous to provide the layer of contact adhesive in the front edge region of the adhesive information carrier, i.e. in the region which is the first to be picked up by the printer in the direction of feeding 6 of the set. In this way disruption of the printer by an adhesive information carrier becoming detached can be reliably avoided.

In a corresponding manner the staggered edge regions of the uncovered fronts of the adhesive information carriers are provided on the rear edge regions of the adhesive information carriers in the direction of feeding the set.

If the layer of contact adhesive is provided over the entire surface on the back of each adhesive information carrier, user safety can be increased, since even a set which is incorrectly fed in around it would not cause any disruption in the printer.

In order to ensure a clean print particularly in the region of the edge regions of the adhesive information carriers first picked up by the printer, the front edges 2_c_, 3_c_, 4_c_ of the adhesive information carriers in the direction of feeding the set can be constructed so that they are aligned with one another. However, the staggered construction of the adhesive information carriers then means that all adhesive information carriers have different lengths in the direction of feeding 6, wherein the first adhesive information carrier 2 which comes directly into contact with the supporting sheet I has the greatest length and each adhesive information carrier disposed above it has a shorter length according to the staggering.

Within the scope of the invention, however, it is also conceivable that all adhesive information carriers have the same length in the direction of feeding 6 and accordingly there is also a corresponding stagger in the front edge region in the direction of feeding. Such an embodiment is shown in greater detail in FIGS. 4 and 5.

Thus within the scope of the invention it is conceivable that the staggering is provided in the front and/or rear edge region of the information carriers as viewed in the direction of feeding. In the case of adhesive information carriers of different lengths the aligned construction is likewise conceivable both in the front and the rear edge region.

Figure 4:
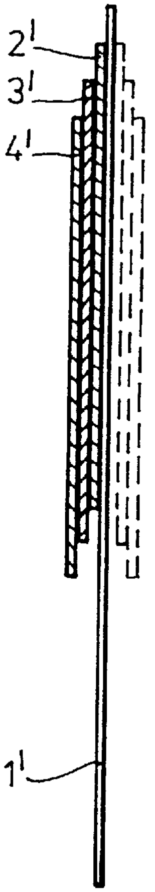
FIG. 4 shows a sectional representation along the line IV—IV in FIG. 5.
Figure 5:
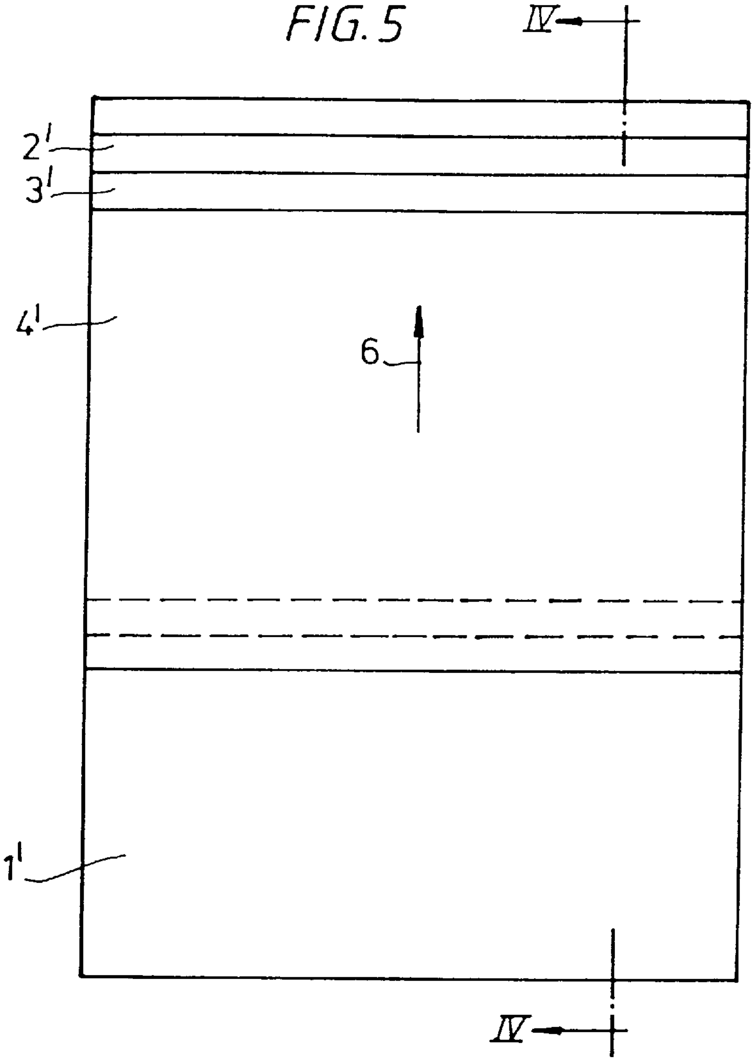
FIG. 5 shows a plan view of the set which can be printed on according to a second embodiment.

In FIG. 4, moreover, a further variant is indicated by broken lines, in which staggered adhesive information carriers are provided both on the front and on the back of the supporting sheet 1' or 1.

The adhesive information carriers 2, 3, 4 or 2', 3', 4' are produced for example from paper or plastics material. The supporting sheet 1 advantageously has an adhesive-repellent coating on its side facing the adhesive information carriers and is made for example from a paper-like or plastic-like material.

The size of the supporting sheet depends on the one hand upon the size of the adhesive information carriers used and on the other hand upon the minimum size which can be introduced into and printed on by usual commercial desktop printers. At present the dimensions of the smallest document which can be printed are 76×127 mm.

The width B of the supporting sheet advantageously also corresponds to the width of the adhesive information carriers, although the length of the adhesive information carriers can be smaller than the length of the supporting sheet.

The region of the supporting sheet which is not covered by the adhesive information carriers can be used for example for information concerning the handling of the set In a particular embodiment of the invention the back of the adhesive information carriers has markings 8 in the form of lines (see FIG. 6) which are disposed for example in the form of a grid. In this way it is readily possible to reduce a printed adhesive information carrier to a smaller size, for example with scissors.

What is claimed is:

1. A set which can be printed on, comprising:

a flat supporting sheet (1; 1'); and a plurality of flat repositionable adhesive information carriers (2, 3, 4; 2', 3' 4') which each have a front and a back and which are provided on their back with a layer of contact adhesive (5);

wherein all adhesive information carriers (2, 3, 4; 2', 3' 4') are disposed above one another and staggered with respect to one another on the supporting sheet (1; 1') in such a way that the first adhesive information carrier (2; 2') with its layer of contact adhesive (5) is detachably disposed on the supporting sheet (1; 1') and the next adhesive information carrier (3, 4; 3', 4') is disposed with its layer of contact adhesive (5) detachably on the front of the adhesive information carrier (2, 3; 2', 3') lying below it, wherein a region of the front of the underlying adhesive information carrier (2, 3; 2', 3') is not covered by the adhesive information carrier lying above it, and wherein all the adhesive information carriers have the same length.

2. A set which can be printed on as claimed in claim 1, wherein the back of the adhesive information carrier (2, 3, 4; 2', 3', 4') is provided with a layer of contact adhesive over the entire surface.

3. A set which can be printed on as claimed in claim 1, wherein the layer of contact adhesive (5) is provided only in a region of the back of the adhesive information carrier (2, 3, 4; 2', 3', 4').

4. A set which can be printed on as claimed in claim 3, wherein the region extends over the entire width of the adhesive information carrier in an edge region.

5. A set which can be printed on as claimed in claim 1, wherein the layer of contact adhesive (5) is provided in a front edge region of the adhesive information carrier (2, 3, 4; 2', 3', 4'), in the direction of feeding the set into a printer, and extends over the entire width thereof.

6. A set which can be printed on as claimed in claim 1, wherein the layer of contact adhesive (5) is provided in a front edge region of the adhesive information carrier (2, 3, 4; 2', 3', 4'), in the direction of feeding the set into a printer and extends over the entire width thereof and the uncovered regions of the fronts, in the direction of feeding the set into a printer, are provided in the rear edge region of the adhesive information carriers.

7. A set which can be printed on as claimed in claim 1, wherein the adhesive information carriers (2, 3, 4; 2', 3', 4') are produced from paper or plastics material.

8. A set which can be printed on as claimed in claim 1, wherein the supporting sheet (1; 1') has an adhesive-repellent coating on its side facing the adhesive information carriers.

9. A set which can be printed on as claimed in claim 1, wherein the supporting sheet (1; 1') is made from a paper-like or plastic-like material.

10. A set which can be printed on as claimed in claim 1, wherein the front edges (2_c_, 3_c_, 4_c_), in the direction of feeding the set into the printer, of the adhesive information carriers (2, 3, 4; 2', 3', 4') which are disposed one above the other are staggered with respect to one another.

11. A set which can be printed on as claimed in claim 1, wherein the supporting sheet has staggered adhesive information carriers both on its front and on its back.

12. A set which can be printed on as claimed in claim 1, wherein the adhesive information carrier (2, 3, 4; 2', 3', 4') has markings (8) in the form of lines on its side having the contact adhesive (5).

* * * * *